(12) United States Patent
Flickinger et al.

(10) Patent No.: US 10,420,285 B2
(45) Date of Patent: Sep. 24, 2019

(54) TRANSITION DEVICE FOR A COMBINE THRESHING SYSTEM

(71) Applicant: CNH Industrial America LLC, New Holland, PA (US)

(72) Inventors: Wayne Thomas Flickinger, Oxford, PA (US); Herbert Max Farley, Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/625,057

(22) Filed: Jun. 16, 2017

(65) Prior Publication Data

US 2018/0359928 A1 Dec. 20, 2018

(51) Int. Cl.
*A01F 12/10* (2006.01)
*A01F 7/06* (2006.01)
*A01F 12/46* (2006.01)

(52) U.S. Cl.
CPC ............. *A01F 7/067* (2013.01); *A01F 7/06* (2013.01); *A01F 12/46* (2013.01)

(58) Field of Classification Search
CPC ............ A01F 7/06; A01F 7/067; A01F 12/10
USPC ...................................... 460/68, 70
See application file for complete search history.

(56) References Cited

U.S. PATENT DOCUMENTS

| | | | |
|---|---|---|---|
| 3,228,176 A * | 1/1966 | Stout ..................... | A01D 41/08 460/67 |
| 3,537,460 A * | 11/1970 | Van Buskirk .......... | A01F 12/00 460/68 |
| 3,828,793 A * | 8/1974 | Gochanour ............. | A01F 12/00 460/70 |
| 4,148,323 A | 4/1979 | McMillen et al. | |
| 4,291,709 A | 9/1981 | Weber et al. | |
| 4,900,290 A | 2/1990 | Tanis | |
| 4,986,794 A | 1/1991 | Ricketts | |
| 5,344,367 A | 9/1994 | Gerber | |
| 5,387,153 A | 2/1995 | Tanis | |
| 6,517,431 B2 * | 2/2003 | Schwersmann ......... | A01F 7/06 460/16 |
| 6,830,512 B2 | 12/2004 | Tanis et al. | |
| 2004/0023703 A1 * | 2/2004 | Tanis ..................... | A01F 7/06 460/68 |

(Continued)

OTHER PUBLICATIONS

Extended European Search Report for European Application No. 18198420.4 dated Apr. 18, 2019 (five pages).

*Primary Examiner* — Alicia Torres
(74) *Attorney, Agent, or Firm* — Peter K. Zacharias; Patrick M. Sheldrake

(57) ABSTRACT

A transition device for a combine harvester includes a body having an inlet end and an outlet end. A plurality of vanes are positioned on an interior facing surface of the body for guiding crop material through the transition device. Each vane has a first end positioned either on or adjacent the inlet end of the body and a second end positioned either on or adjacent the outlet end of the body. An arc length between the first ends of two adjacent vanes of the plurality of vanes is less than or equal to an arc length between the second ends of the two adjacent vanes of the plurality of vanes, such that the crop material can expand between the two adjacent vanes upon travelling along a trajectory from the inlet end to the outlet end of the transition device.

20 Claims, 4 Drawing Sheets

(56) References Cited

U.S. PATENT DOCUMENTS

2014/0174049 A1\* 6/2014 Ricketts ................. A01F 12/26
                       56/14.6
2016/0262309 A1\* 9/2016 Regier .................... A01F 12/26
2017/0013781 A1  1/2017 Flickinger et al.
2017/0079212 A1  3/2017 Bok
2017/0105350 A1  4/2017 Ricketts et al.

\* cited by examiner

TRANSITION DEVICE FOR A COMBINE THRESHING SYSTEM

FIELD OF THE INVENTION

The present invention pertains to an agricultural combine or harvester and, more specifically, to a threshing system with a transition cone.

BACKGROUND OF THE INVENTION

As described in U.S. Patent Application Publ. No. 20170013781 to Flickinger, which is incorporated by reference herein in its entirety, an agricultural harvester known as a "combine" is historically termed such because it combines multiple harvesting functions with a single harvesting unit, such as picking, threshing, separating and cleaning. A combine includes a header, which removes the crop from a field, and a feeder housing which transports the crop matter into a rotary threshing and separating system.

The rotary threshing and separating system includes one or more rotors which extends axially (front to rear) or transversely within the body of the combine, and which is partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system.

A transition cone is positioned between the feeder housing and the concave. The transition cone directs the gathered crop material toward the rotor cage while narrowing, acting as a funnel for the gathered crop material toward the rotor.

A prior art rotary threshing and separating system is shown in FIG. 1. Referring now to FIG. 1, which is reproduced from U.S. Patent Application Publ. No. 20170013781 to Flickinger, a prior art rotor assembly 72 which can be included in a threshing and separating system is shown and generally includes a rotor 74 defining a longitudinal axis A1, a concave 76 partially surrounding the rotor 74 and having perforations formed through, and a transition cone 80 connected to the concave 76 at a connection point 82 and defining an infeed to the rotor 74 from, for example, a feeder housing.

The transition cone 80 has a frusto-conical shape defined about the longitudinal axis A1 that ends abruptly at the connection point 82 between the transition cone 80 and the rotor cage 76. The transition cone 80 has a tapering diameter along its length so that as the transition cone 80 approaches the connection point 82, the transition cone 80 narrows.

The transition cone 80 includes a series of vanes 88 disposed along its inner surface for directing the crop material toward the reduced clearance W1 between the rotor 74 and the connection point 82. The vanes 88 guide the crop material as it travels along a conical spiral trajectory within the cone 80. It should be understood that the cone 80 remains fixed in position as the rotor 74 rotates about its axis to deliver crop material through the cone 80 and the concave 76.

Each vane 88 has a conical spiral shape, and extends from the inlet of the cone 80 to the outlet of the cone 80. The vanes 88 are uniformly spaced apart in a radial manner about the longitudinal axis A1, and are arranged at an equal pitch about the longitudinal axis A1. The first ends of the vanes 88 at the inlet end of the cone 80 are uniformly spaced apart about the inlet end of the cone 80, and, the second ends of the vanes 88 at the outlet end of the cone 80 are uniformly spaced apart about the outlet end of the cone 80. Such an arrangement of vanes is also disclosed in U.S. Pat. No. 6,830,512 to Tanis, for example (see vanes 61), and FIG. 3 of U.S. Pat. No. 4,148,323, which are each incorporated by reference herein in their entirety.

In operation, the incoming crop material initially travels in a linear fashion up the feeder housing (see item 20 of U.S. Patent Application Publ. No. 20170013781 to Flickinger). The majority of crop material then enters the inlet end of the transition cone 80 over a defined arc of about 180 degrees, which is significantly less than the 360 degree circumference of the inlet end of the cone 80. The crop material transitions from a linear motion to a rotary motion as it enters the cone 80 and travels between adjacent vanes 88 of the cone 80.

The vanes 88 compress the crop material as it transitions from a larger circumferential area at the inlet of the cone 80 to a smaller circumferential area at the outlet of the cone 80. The compressed crop material ultimately exits the cone 80 over a 180 degree exit area and enters the threshing chamber.

Because the arc length of the crop material at the inlet end of the cone 80 is greater than the arc length of the crop material at the outlet end of the cone 80, due to the geometry and position of the vanes 88, the crop material becomes compressed as it travels through the cone 80. It has been found that the rotary threshing system can have difficulty in managing the compressed crop material in an efficient manner.

To improve threshing performance and machine capacity, it would be desirable to deliver crop material from the 180 degree inlet portion of the transition cone and discharge the crop material over a larger discharge area, i.e., greater than 180 degrees. Stated differently, it would be desirable to increase the arc length of the crop material as it travels through the cone 80, and thereby limit compression of the crop material.

What is needed in the art is a threshing and separating system that experiences lowered crop pressure between the transition cone and the threshing chamber. Based on the foregoing reasons, there is a need for improved threshing and separating systems that address multiple objectives, including but not limited to increased energy efficiency and better control over crop flow through the threshing and separating system.

SUMMARY OF THE INVENTION

The drawbacks of conventional threshing and separating systems are addressed in many aspects by threshing and separating systems in accordance with the invention.

According to one embodiment of the invention, a transition device for a threshing system for an agricultural harvester is provided. The transition device includes a body having an inlet end for receiving crop material from a feeder source, and an outlet end opposite the inlet end for distributing crop material into a threshing space of the threshing system. A plurality of vanes are positioned on an interior facing surface of the body for guiding the crop material through the transition device. Each vane has a first end positioned either on or adjacent the inlet end of the body and a second end positioned either on or adjacent the outlet end of the body. An arc length defined between the first ends of two adjacent vanes of the plurality of vanes is less than or equal to an arc length defined between the second ends of the two adjacent vanes of the plurality of vanes, such that the crop material can expand between the two adjacent vanes upon travelling along a trajectory from the inlet end to the outlet end of the transition cone.

BRIEF DESCRIPTION OF THE DRAWINGS

For the purpose of illustration, there are shown in the drawings certain embodiments of the present invention. It should be understood, however, that the invention is not limited to the precise components, arrangements, dimensions, and instruments shown. Like numerals indicate like elements throughout the drawings. In the drawings.

DETAILED DESCRIPTION OF THE INVENTION

Various terms are used throughout the disclosure to describe the physical shape or arrangement of features. A number of these terms are used to describe features on rotors and cages that either have, or conform to, a cylindrical or generally cylindrical geometry characterized by a radius and a center axis perpendicular to the radius. Unless a different meaning is specified, the terms are given the following meanings. The terms "longitudinal", "longitudinally", "axial" and "axially" refer to a direction, dimension or orientation that is parallel to the center axis of the cone. For example, the length of a cone is considered a "longitudinal" dimension. The terms "radial" and "radially" refer to a direction, dimension or orientation that is perpendicular to the center axis of the cone. For example, the radius and diameter of a cone are considered "radial" dimensions. The terms "inward" and "inwardly" refer to a direction, dimension or orientation that extends in a radial direction toward the center axis. The terms "outward" and "outwardly" refer to a direction, dimension or orientation that extends in a radial direction away from the center axis.

Figure 1:
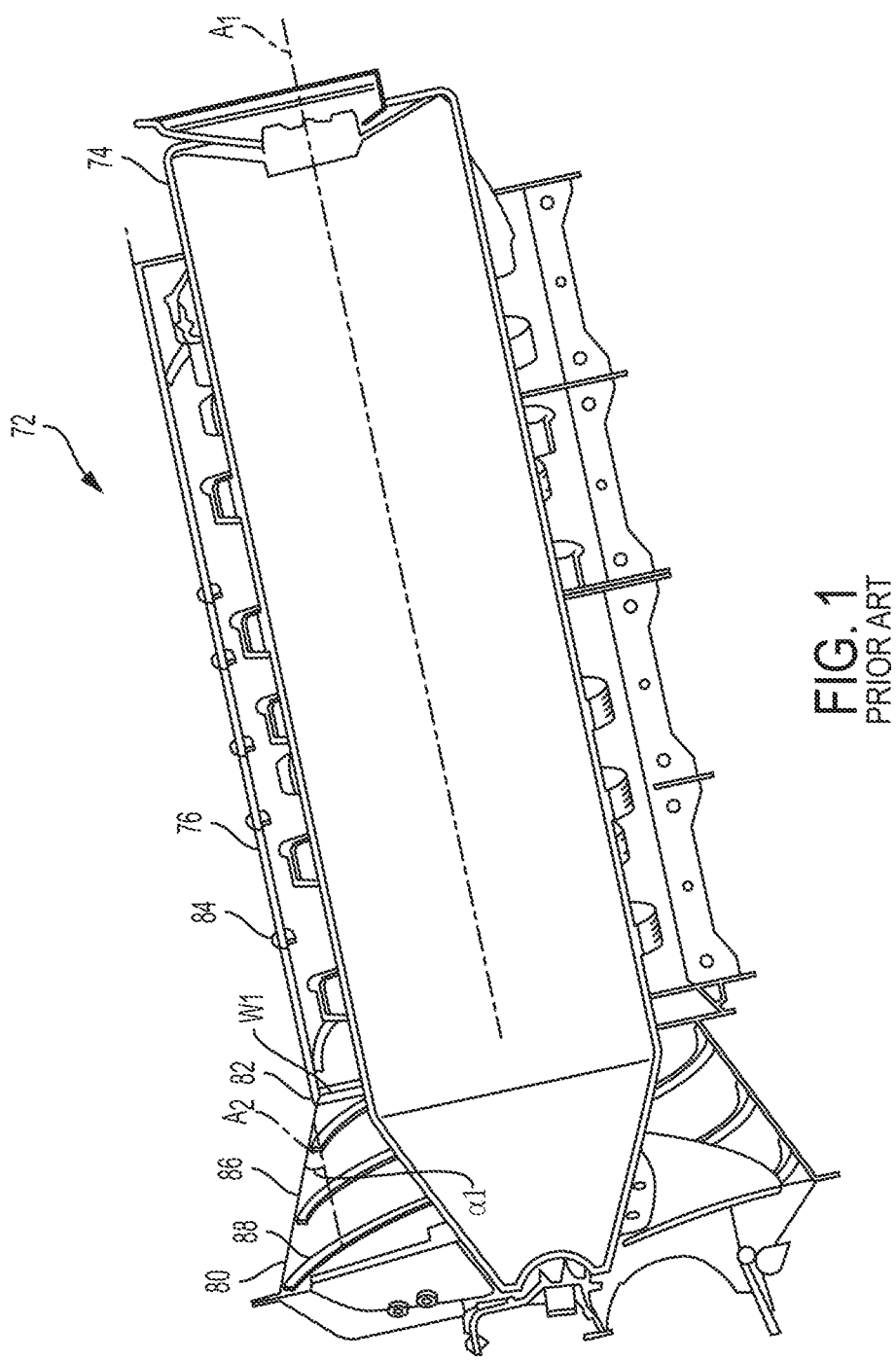
FIG. 1 illustrates a cross-sectional view of a threshing system in accordance with the prior art.
Figure 2:
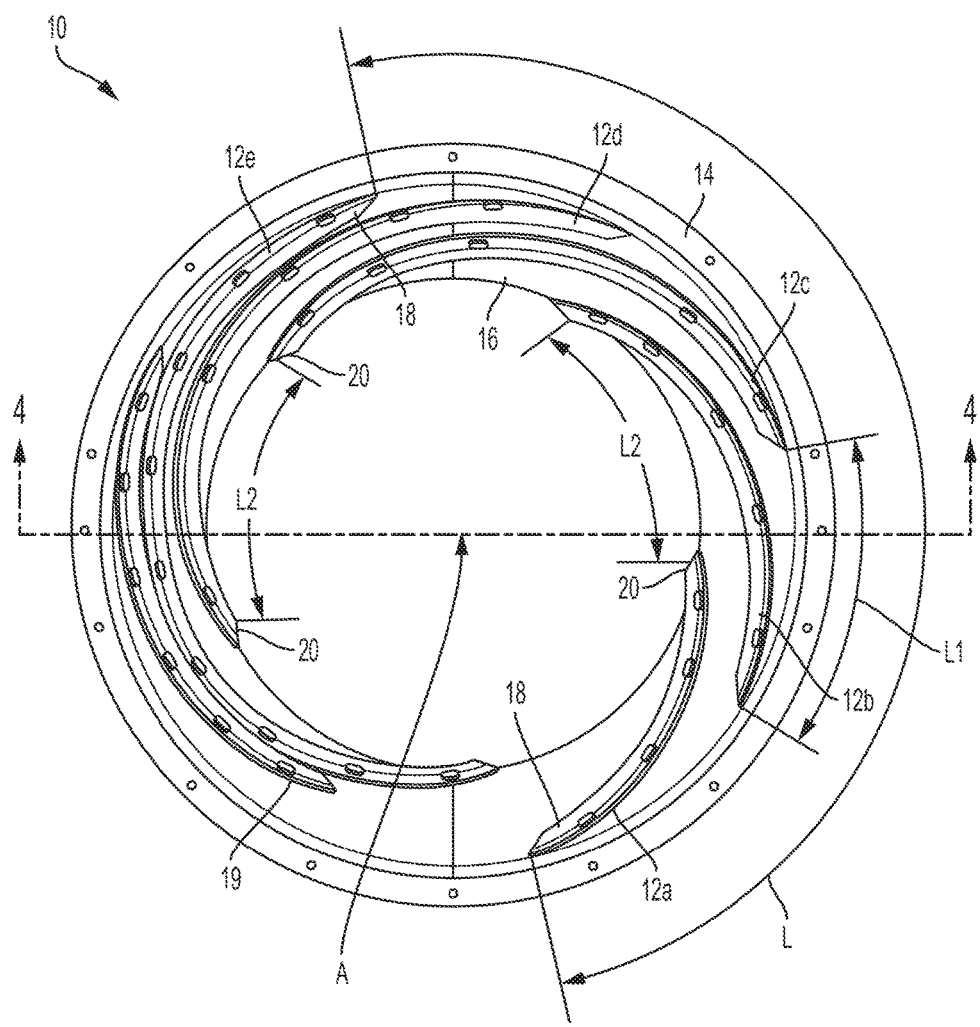
FIG. 2 depicts a front elevation view of a transition cone according to an exemplary embodiment of the present invention.
Figure 3:
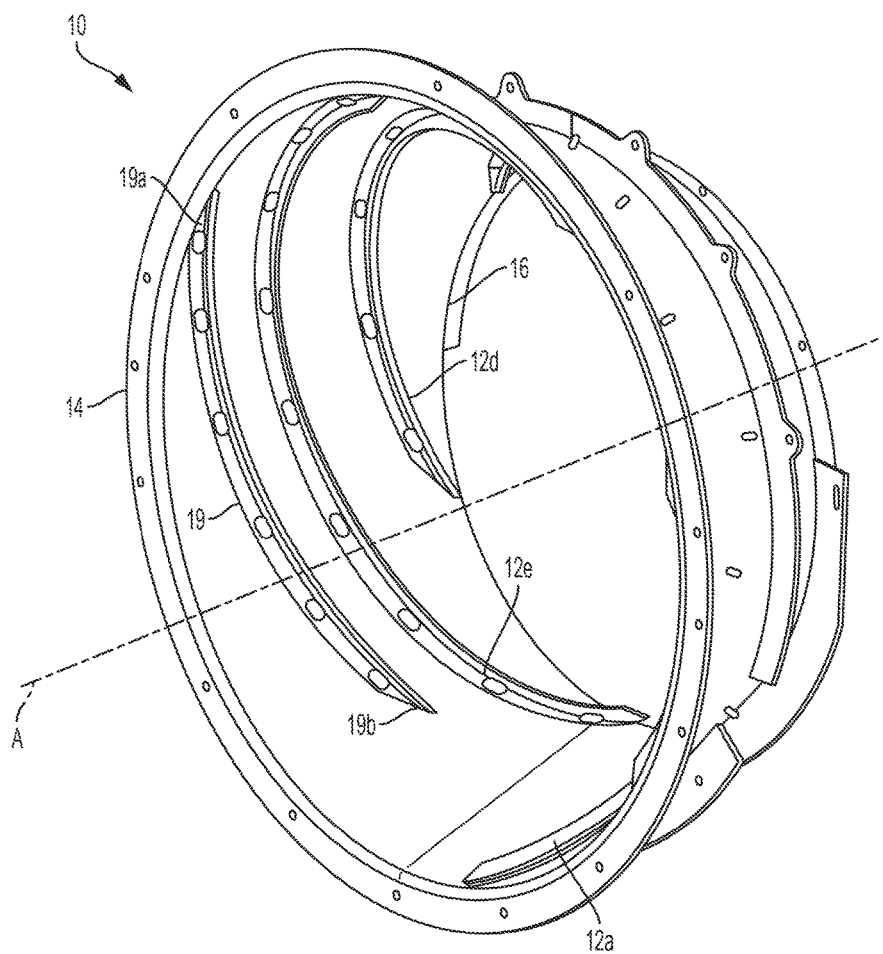
FIG. 3 depicts an isometric view of the transition cone of FIG. 2.
Figure 4:
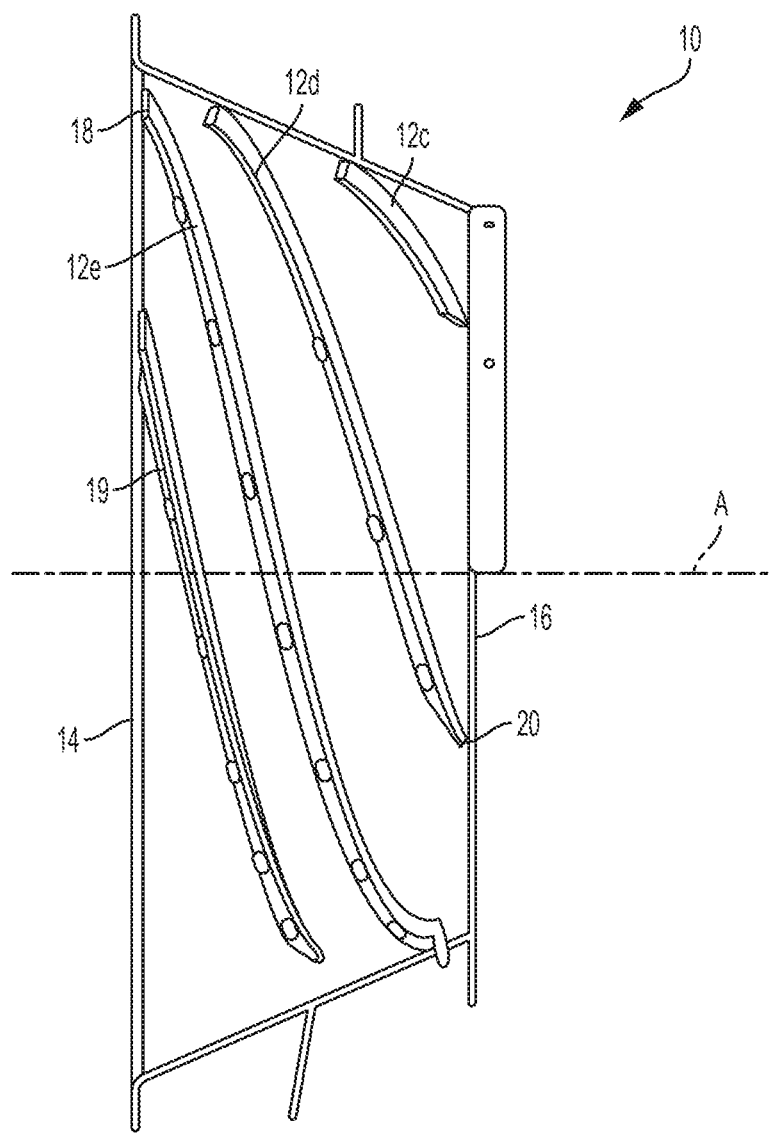
FIG. 4 depicts a cross-sectional view of the cone of FIG. 2 taken along the lines 4-4.

Referring now to the instant invention shown in FIGS. 2-4, a different transition cone 10 is shown. The transition cone 10 is configured for use with a rotor assembly, such as the rotor assembly 72 of FIG. 1. Like the transition cone 80 of FIG. 1, the transition cone 10 of FIGS. 2 and 3 has a frusto-conical shape defined about the longitudinal axis A that ends abruptly at the connection point between the transition cone 10 and the rotor cage (such as cage 76 of FIG. 1). The transition cone 10 may be more generally referred to herein as a transition device since it can have either a frusto-conical or a cylindrical shape. The transition cone may also be referred to in the art as a cover of an infeed section.

The primary differences between the cone 80 of FIG. 1 and the cone 10 of FIGS. 2 and 3 is that the cone 10 includes a set of five vanes 12a-12e (referred to either collectively or individually as vane(s) 12). Each vane 12 has a conical spiral shape, and extends continuously from the large-diameter inlet end 14 of the cone 10 to the small-diameter outlet end 16 of the cone 10. Each vane 12 includes a first end 18 (i.e., starting point) at the inlet end 14 of the cone 10, and a second end 20 (i.e., end point) at the outlet end 16 of the cone 10.

The vanes 12 have an unequal pitch about the longitudinal axis A. In other words, no two vanes 12 have the same pitch. The pitch (or lead) of a vane is the distance along the axis of the cone 10 that is covered by one complete rotation of the vane. It should be understood that the length of the cone 10 is relatively short such that none of the vanes 12 rotate completely about the cone 10.

The vane 12a, having a first end 18 at the bottom of the inlet end 14 cone 10, has the longest pitch. The pitch of the vanes 12 decreases in the clockwise direction about the longitudinal axis A (as viewed in FIG. 2) such that the vane 12a has the longest pitch and the vane 12e has the shortest pitch.

The first ends 18 of the vanes 12 are positioned along the inlet 14 of the cone 10 where the concentrated in-feed of crop material occurs. The first ends 18 of the vanes 12 are uniformly spaced apart about an arc length L of the circumference of the inlet 14. The arc length L is about 180 degrees, for example. It should be understood that the number of vanes 12 could vary, and, if so, the first ends 18 would be uniformly spaced apart by about 180/X degrees, where X equals the number of vanes.

The above-described arrangement of the first ends 18 assumes that the rotor is rotating in a counterclockwise direction, as viewed in FIG. 2. If the rotor were to rotate in a clockwise direction, then the first ends 18 would be concentrated in the circumference of the inlet 14 that is outside of arc length L.

The pitch of each vane 12 is selected such that the arc length L1 between the first ends 18 of two adjacent vanes 12 is equal to or less than the arc length L2 between the second ends 20 of those two adjacent vanes 12. Accordingly, the crop material travelling between those two vanes 12 is not compressed at the outlet of the cone 10, which would result in increased crop pressure and inefficient threshing of the crop material.

The second ends 20 are uniformly spaced apart by about an arc length L2 of about 72 degrees about the circumference of the outlet 16 of the cone 10. If the number of vanes 12 vary, then the second ends 20 will be uniformly spaced apart by about 360/X degrees, where X equals the number of vanes.

Each vane 12 is provided in the form of an L-shaped bracket (as viewed in cross-section), although, the cross-sectional shape of each vane 12 could vary. The vanes 12 may be a separate component that is mounted to the cone 10, or, alternatively, the vanes 12 could be integrated with the cone 10.

A supplemental vane 19 is positioned between the vanes 12a and 12e. The vane 19 includes a first end 19a that is positioned adjacent the inlet 14 and a second end 19b that is spaced from the outlet 16.

In operation, the incoming crop material initially travels in a linear fashion up the feeder housing (see item 20 of U.S. Patent Application Publ. No. 20170013781 to Flickinger). The rotor draws the crop material into the inlet end of the transition cone 10 over the defined arc length L. The crop material transitions from a linear motion to a rotary motion as it enters the cone 10 and travels between adjacent vanes 12 of the cone 10.

Because the arc length L1 of the crop material travelling between adjacent vanes 12 at the inlet end 14 of the cone 10 is less than the arc length L2 of the crop material travelling between those adjacent vanes 12 at the outlet end 16 of the cone 10, due to the geometry and position of the vanes 12, the crop material can expand as it travels between those adjacent vanes 12 and through the cone 10. The crop material ultimately exits the cone 10 over an exit area that is greater than 120 degrees. Because the crop material has not been compressed to any significant degree, the rotary threshing system has an easier time managing the crop material in an efficient manner, as compared with prior art threshing systems.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A transition device for a threshing system for an agricultural harvester, the transition device comprising:
   a body having an inlet end for receiving crop material from a feeder source, and an outlet end opposite the inlet end for distributing crop material into a threshing space of the threshing system; and
   a plurality of vanes positioned on an interior facing surface of the body for guiding the crop material through the transition device, each vane having a first end positioned at the inlet end of the body and a second end positioned either on or adjacent the outlet end of the body, wherein an arc length between the first ends of two adjacent vanes of the plurality of vanes is less than or equal to an arc length between the second ends of the two adjacent vanes of the plurality of vanes, such that the crop material can expand between the two adjacent vanes upon travelling along a trajectory from the inlet end to the outlet end of the transition device, wherein the first end of each vane intersects the inlet end of the body.

2. The transition device of claim 1, wherein the body has a frusto-conical shape.

3. The transition device of claim 1, wherein a diameter of the inlet end of the body is greater than a diameter of the outlet end of the body.

4. The transition device of claim 1, wherein each vane has a spiral shape.

5. The transition device of claim 4, wherein a pitch of each vane is different.

6. The transition device of claim 5, wherein the pitch of the vanes successively decreases from one vane of the plurality of vanes to an adjacent vane of the plurality of vanes.

7. The transition device of claim 1, wherein the second ends of the vanes are uniformly spaced apart about a circumference of the outlet end of the body.

8. The transition device of claim 7, wherein the first ends of the vanes are not uniformly spaced apart about a circumference of the inlet end of the body.

9. The transition device of claim 1, wherein the first ends of the vanes are positioned on only one side of the inlet end of the body.

10. A transition device for a threshing system for an agricultural harvester, the transition device comprising:
    a body having an inlet end for receiving crop material from a feeder source, and an outlet end opposite the inlet end for distributing crop material into a threshing space of the threshing system; and
    a plurality of vanes positioned on an interior facing surface of the body for guiding the crop material through the transition device, each vane having a first end positioned at the inlet end of the body and a second end positioned either on or adjacent the outlet end of the body, wherein an arc length between the first ends of two adjacent vanes of the plurality of vanes is less than or equal to an arc length between the second ends of the two adjacent vanes of the plurality of vanes, such that the crop material can expand between the two adjacent vanes upon travelling along a trajectory from the inlet end to the outlet end of the transition device, wherein the first ends of the vanes are positioned on only one side of the inlet end of the body, and
    wherein the first ends of the vanes are uniformly spaced apart about said one side of the inlet end of the body.

11. The transition device of claim 1, wherein each vane extends towards a longitudinal axis of the body.

12. The transition device of claim 1, wherein the second end of each vane intersects the outlet end of the body.

13. The transition device of claim 1, wherein each vane extends continuously between the first end and the second end of the vane.

14. The transition device of claim 1, wherein an angle separating adjacent second ends is greater than an angle separating adjacent first ends.

15. The transition device of claim 1, wherein the first end of each vane intersects the inlet end of the body.

16. A transition device for a threshing system for an agricultural harvester, the transition device comprising:
    a body having an inlet end for receiving crop material from a feeder source, and an outlet end opposite the inlet end for distributing crop material into a threshing space of the threshing system; and
    a plurality of curved vanes positioned on an interior facing surface of the body for guiding the crop material through the transition device, each curved vane having a first end positioned either on or adjacent the inlet end of the body and a second end positioned either on or adjacent the outlet end of the body,
    wherein the first ends of the vanes are not uniformly distributed about an entire circumference of the inlet end, and the second ends of the vanes are uniformly distributed about an entire circumference of the outlet end, and
    wherein an arc length between the first ends of two adjacent curved vanes of the plurality of vanes is less than or equal to an arc length between the second ends of the two adjacent curved vanes of the plurality of vanes, such that the crop material can expand between the two adjacent curved vanes upon travelling along a spiral trajectory from the inlet end to the outlet end of the transition device.

17. The transition device of claim 16, wherein the first ends of the vanes are positioned on only one side of the inlet end of the body.

18. The transition device of claim 16, wherein the first ends of the vanes are uniformly spaced apart about said one side of the inlet end of the body.

19. The transition device of claim 16, wherein a pitch of each vane is different.

20. The transition device of claim 19, wherein the pitch of the vanes successively decreases from one vane of the plurality of vanes to an adjacent vane of the plurality of vanes.

* * * * *